United States Patent [19]

Baker

[11] Patent Number: 5,383,337
[45] Date of Patent: Jan. 24, 1995

[54] METHOD AND APPARATUS FOR PRECOOLING WATER SUPPLIED TO AN EVAPORATIVE COOLER WITH A SUBTERRANEAN HEAT EXCHANGER

[76] Inventor: Edward R. Baker, 22051 South Ave., Corning, Calif. 96021

[21] Appl. No.: 189,073

[22] Filed: Jan. 28, 1994

[51] Int. Cl.6 ............................................. F25D 23/12
[52] U.S. Cl. ..................................... 62/121; 62/260; 62/310; 62/259.4; 261/151; 165/45
[58] Field of Search ................ 62/238.1, 260, 259.4, 62/310; 165/45; 261/151

[56] References Cited

U.S. PATENT DOCUMENTS

| | | | |
|---|---|---|---|
| 1,887,938 | 11/1932 | Lewis | 62/259.4 |
| 2,660,863 | 12/1953 | Gerhart, Jr. | 62/259.4 |
| 2,722,107 | 11/1955 | Gay. | |
| 4,240,268 | 12/1980 | Yuan. | |
| 4,993,483 | 2/1991 | Harris. | |

Primary Examiner—John M. Sollecito
Attorney, Agent, or Firm—Jerry T. Kearns

[57] ABSTRACT

An apparatus for precoooling water supplied to an evaporative cooler of the type known as a "swamp cooler" includes inlet and outlet reservoirs secured by brackets to a bottom surface of the evaporative cooler water pan at substantially the same elevation. The inlet and outlet reservoirs are connected in fluid communication with a subterranean vessel enclosing a cooling coil. In use, water is supplied to the inlet reservoir and maintained at a predetermined level by a float valve assembly. A filtered drain line returns water from the evaporative cooler pan into the inlet reservoir from which it drains by gravity flow into the cooling coil within the subterranean vessel. The water circulates within the coil to precool and thereafter discharges and mixes within the vessel. A pump in the outlet reservoir pumps water from a return line communicating with the vessel back to the evaporative cooler.

20 Claims, 4 Drawing Sheets

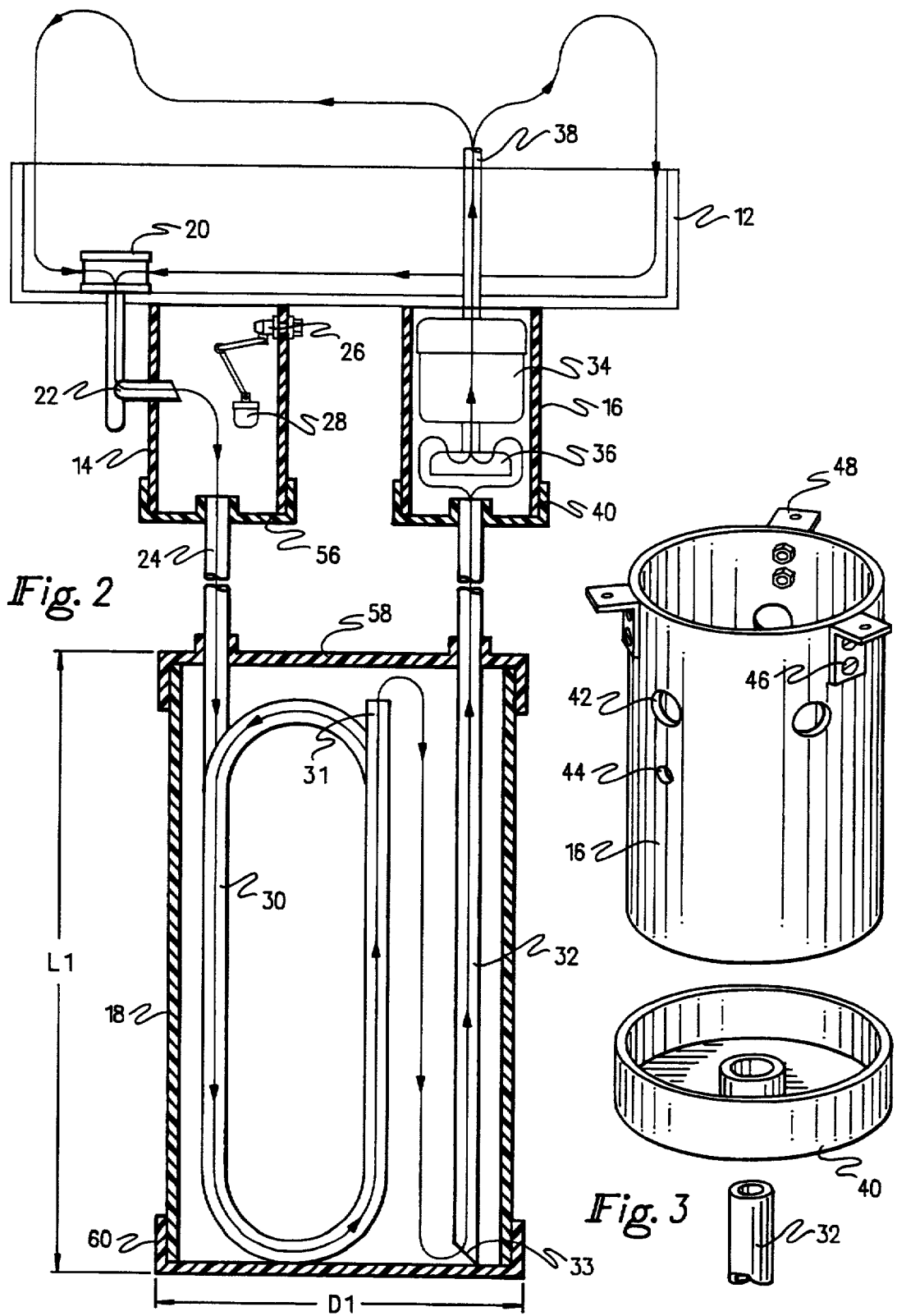

METHOD AND APPARATUS FOR PRECOOLING WATER SUPPLIED TO AN EVAPORATIVE COOLER WITH A SUBTERRANEAN HEAT EXCHANGER

BACKGROUND OF THE INVENTION

The present invention relates to evaporative coolers, of the type known as "swamp coolers", designed to cool homes and other buildings through an evaporative cooling effect. These conventional forms of evaporative coolers employ a fan to draw air across water saturated pads or drums. The evaporating water withdraws the latent heat of vaporization from the airstream, thus cooling room air. The efficiency of evaporative coolers depends to large extent upon the temperature of the supplied water, with efficiency increasing as water temperature drops. Additionally, a lower water temperature allows lower humidity to be maintained in the room air.

SUMMARY OF THE INVENTION

Accordingly, it is an object of the present invention to provide a new and improved method and apparatus for precooling the water supply to an evaporative cooler which includes inlet and outlet reservoirs secured by brackets to a bottom surface of the evaporative cooler water pan at substantially the same elevation. The inlet and outlet reservoirs are connected in fluid communication with a subterranean vessel enclosing a cooling coil. In use, water is supplied to the inlet reservoir and maintained at a predetermined level by a float valve assembly. A filtered drain line returns water from the evaporative cooler pan into the inlet reservoir from which it drains by gravity flow into the cooling coil within the subterranean vessel. The water circulates within the coil to precool, and thereafter discharges into and mixes within the vessel. A pump in the outlet reservoir pumps water from a return line communicating with the vessel back to the evaporative cooler.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 2 is a diagrammatic longitudinal cross sectional view, further illustrating the precooler apparatus of the present invention.

FIG. 3 is an exploded perspective detail view, illustrating the outlet reservoir component of the precooler apparatus of the present invention.

DETAILED DESCRIPTION OF THE PREFERRED EMBODIMENT(S)

Figure 1:
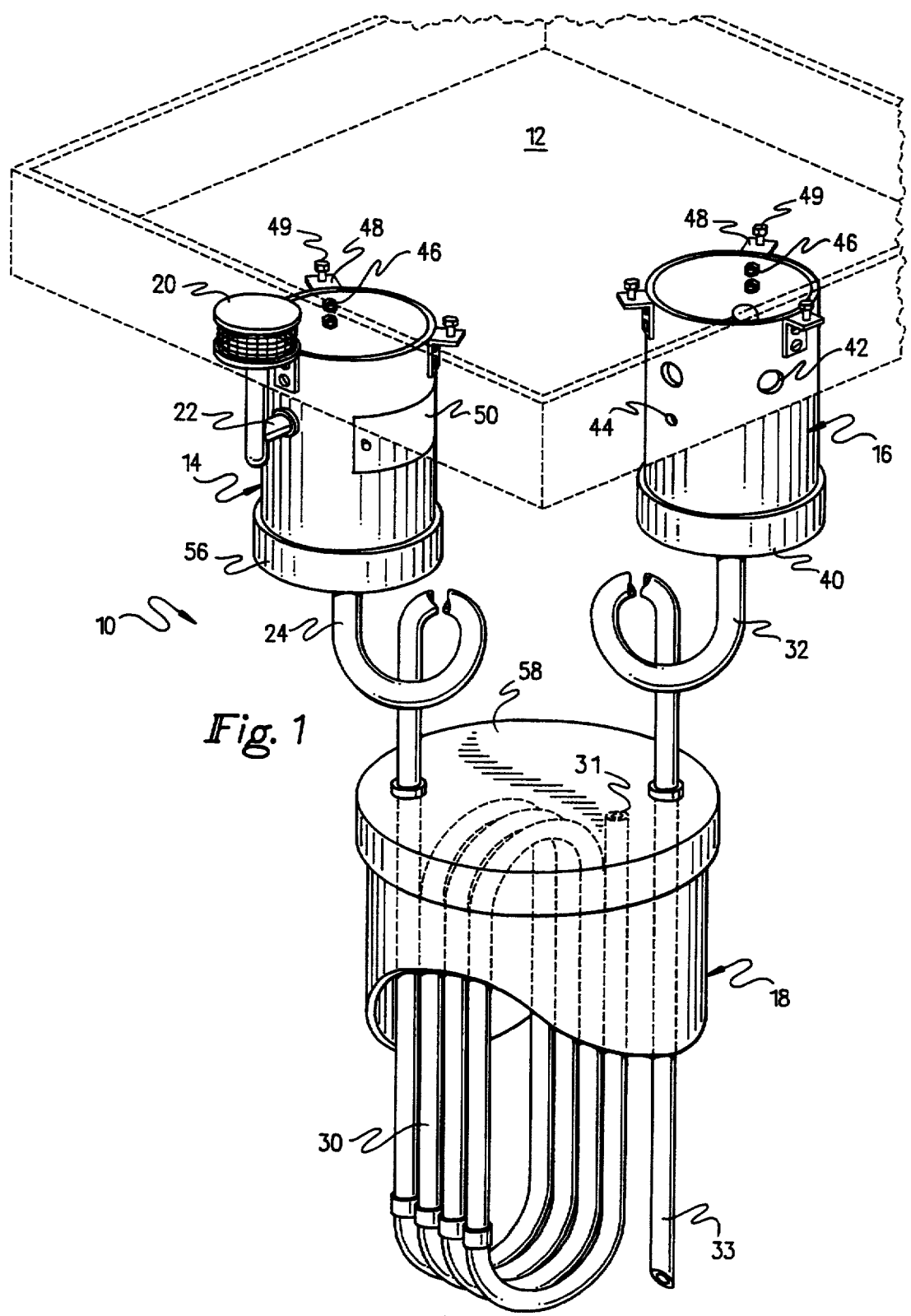
FIG. 1 is a diagrammatic perspective view, partially cut away, illustrating the precooler apparatus of the present invention.

Referring now to the drawings, wherein like reference numerals designate corresponding structure throughout the views, and referring in particular to FIGS. 1 through 7, the method and apparatus for precooling water supplied to an evaporative cooler will be described in further detail. Specifically, the precooler apparatus 10 includes and inlet reservoir 14 and an outlet reservoir 16 secured to a bottom surface of a conventional evaporative cooler water pan 12. The conventional form of evaporative cooler includes a water supply reservoir pan 12 typically filled with water maintained at a predetermined level by a water supply line and a float valve assembly. A pump of a conventional evaporative cooler includes an inlet line which takes suction from the pan 12 and circulates water from the pan 12 to the pads or drum of the evaporative cooler. The present invention is adapted for convenient retrofit installation to existing evaporative coolers of this conventional type, and may also be provided as original equipment.

Figure 5:
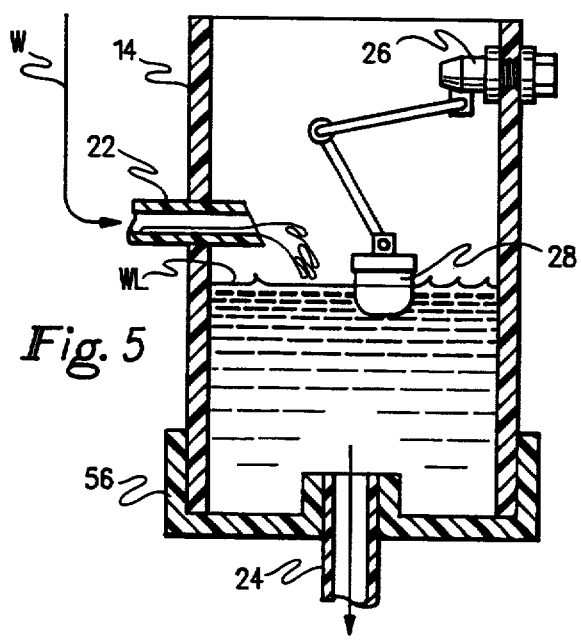
FIG. 5 is a longitudinal cross sectional view, illustrating the inlet reservoir component of the precooler apparatus of the present invention.

The inlet reservoir 14 and outlet reservoir 16 each communicate in a substantially closed circuit fluid flow path with a subterranean vessel or volume chamber 18. A filtered inlet 20 disposed within the pan 12 drains returned water from the evaporative cooler through a drain conduit 22 into the inlet reservoir 14. As best shown in FIG. 5, water from the inlet reservoir 14 drains by gravity flow into a coil inlet 24. A water supply line 26 connected to a conventional water supply source, in conjunction with a float valve assembly 28, maintains a predetermined water level WL within the inlet reservoir 14.

Figure 7:
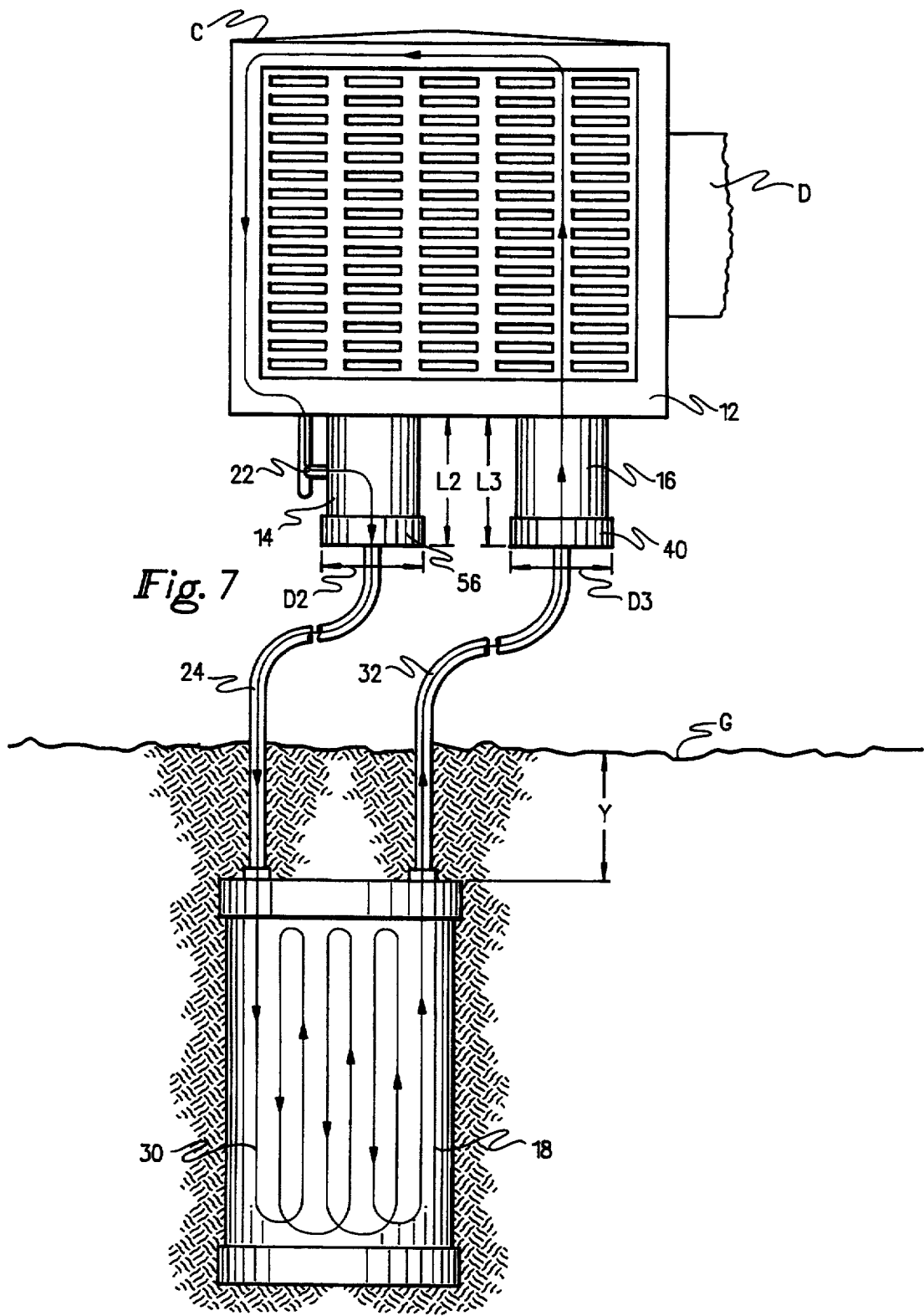
FIG. 7 is a diagrammatic elevational view, illustrating the precooler apparatus of the present invention installed on a conventional evaporative cooler.

As best shown in FIGS. 1 and 2, a coil 30 disposed within the vessel 18 includes a plurality of loops disposed within the vessel 18 and also possesses an outlet 31 discharging adjacent a top portion of the vessel 18. Accordingly, water drains by gravity flow through the coil inlet 24 from the inlet reservoir 14, travels through the coil 30, and then discharges through the outlet 31 for mixing within the vessel 18. As shown in FIG. 7, the subterranean vessel 18 is buried below the ground surface G, preferably at a depth below the frost line, to take advantage of constantly cool subterranean temperatures. Thus, the volume of water within the vessel 18 will be substantially cooled during summer months to an approximately 50° degrees, depending upon local ground temperatures. The return water from inlet reservoir 14 will initially precool as it passes through the loops of the coil 30, and thereafter discharge into and mix with the existing water within the vessel 18.

With reference to FIG. 1 and 2, a return line 32 includes an inlet opening 33 disposed adjacent a bottom end of the vessel 18 so as to withdraw the lower, coolest water from within the vessel 18. A return line 32 communicates with the outlet reservoir 16, and more specifically provides a water supply source to an inlet 36 of a conventional electrically operated pump 34 housed within the outlet reservoir 16.

As shown in FIG. 3, the outlet reservoir 16 includes a bottom end cap 40 including a fluid fitting for sealed connection with the return line 32. A plurality of air vents 42 spaced circumferentially around an upper portion of the outlet reservoir 16 provide ventilation and cooling air to the electric motor of the pump 34 disposed therein. A lower overflow drain 44 serves to drain excess water from the outlet reservoir 16 in the event of a float valve failure or other malfunction. A plurality of right-angle brackets 48 in conjunction with threaded fasteners 46 and 49 serve to secure the inlet reservoir 14 and the outlet reservoir 16 at the same elevation to a bottom surface of the pan 12. In this context, it should be noted that drain conduit 22 provides the only fluid communication between inlet reservoir 14 and the pan 12. Similarly, the pump outlet line 38 provides the only fluid communication between the outlet reservoir 16 and the evaporative cooler.

Figure 4:
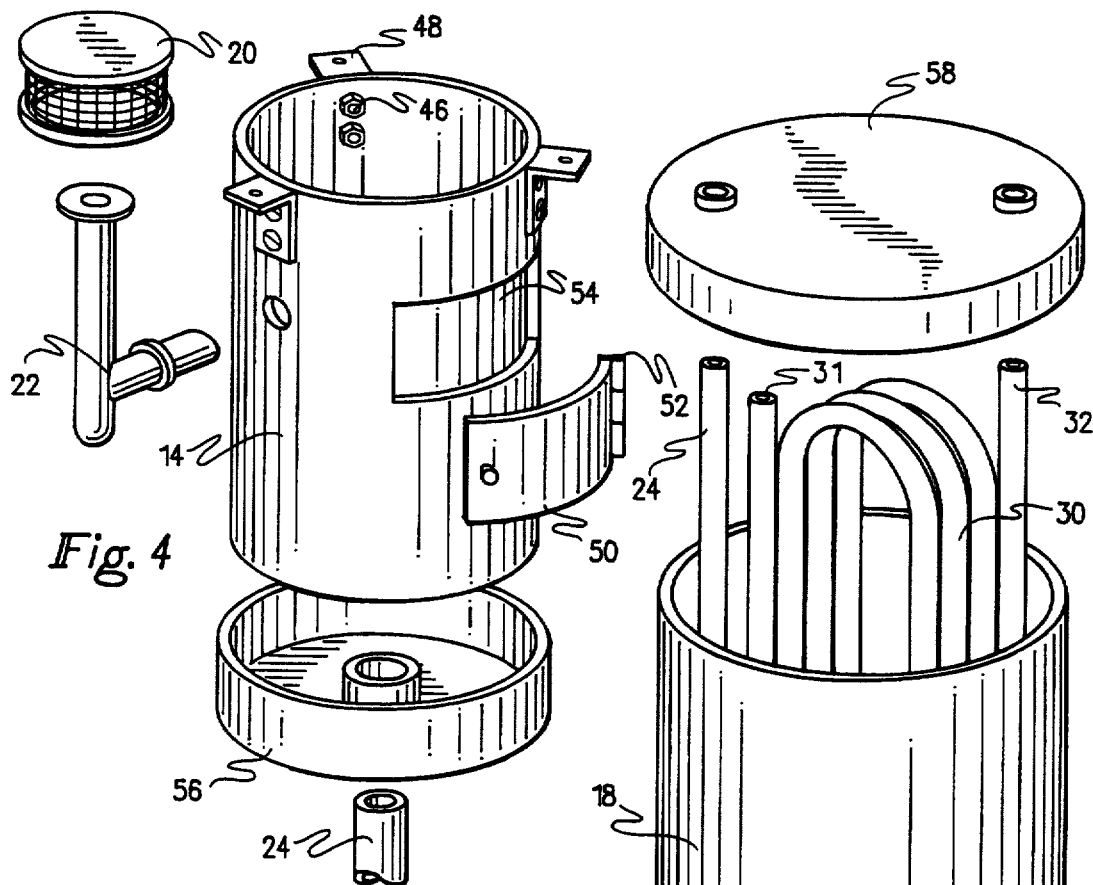
FIG. 4 is an exploded perspective detail view, illustrating the inlet reservoir component of the precooler apparatus of the present invention.

As best shown in FIG. 4, the inlet reservoir 14 includes an inspection door 50 mounted by a hinge 52 over an access opening 54 for facilitating maintenance and adjustment of the float valve assembly 28. A bottom end cap 56 of the inlet reservoir 14 includes a central fitting disposed in sealed relation with the coil inlet conduit 24.

Figure 6:
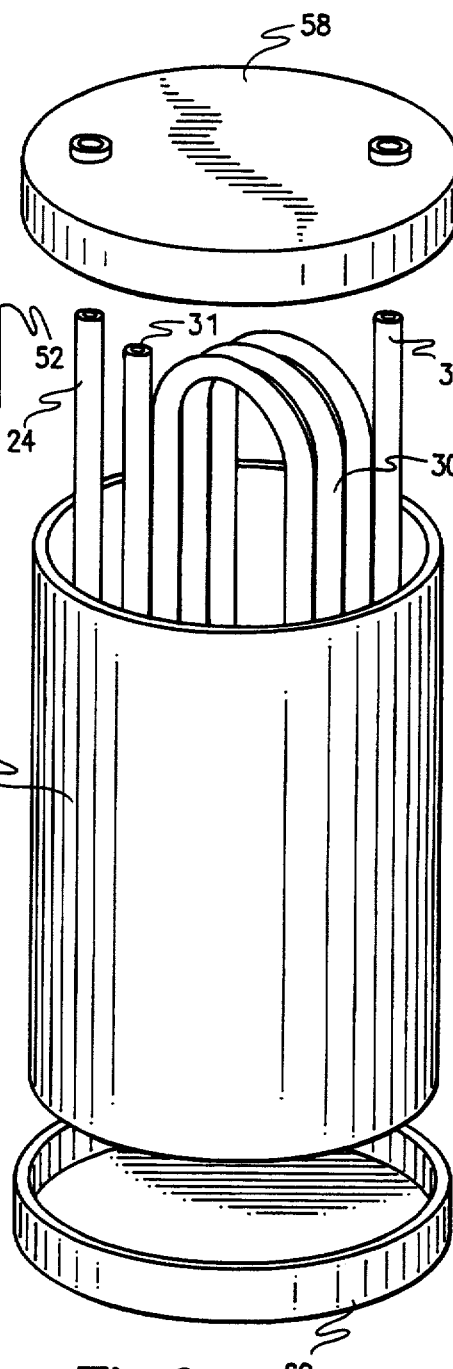
FIG. 6 is an exploded perspective detail view, illustrating the subterranean vessel and cooling coil components of the precooler apparatus of the present invention.

As shown in FIG. 6, the subterranean vessel or volume chamber 18 comprises a cylindrical body portion including top 58 and bottom 60 end caps for enclosing the coil 30 entirely therein.

The inlet reservoir 14, the outlet reservoir 16, the coil 30, the vessel 18, and the various conduits each preferably comprise PVC members to provide for maximum service life with minimum environmental contamination. While the components of the present invention may be formed with a wide variety of different dimensions, an example embodiment illustrated in the drawings includes a subterranean vessel 18 having a length L1 of about 28 inches and a diameter D1 of about 15 inches. With reference to FIG. 7, the inlet reservoir 14 has a length L2 of about 9.5 inches and a diameter D2 of about 6 inches. Similarly, the outlet reservoir 16 has an equal length L3 of about 9.5 inches and a diameter D3 of about 6 inches. The conduits 24, 32, as well as the coil 30 are preferably formed from about 1 inch diameter PVC pipe, with the coil 30 having a length of about 9 feet. The subterranean vessel 18 is preferably buried to a depth Y below the ground surface G of about 18 inches.

Accordingly, the present invention discloses an apparatus and method for precooling water supplied to a conventional down draft or side draft evaporative cooler C of the type including a duct D for providing air flow to a home or other building. The reservoirs 14 and 16, as well as exposed portions of the conduits 24 and 32, are preferably insulated with a conventional insulating material to maintain the lowest possible supply water temperature to the evaporative cooler C.

In addition to increasing the efficiency of the evaporative cooler C, the precooler apparatus 10 of the present invention has the advantage of minimizing fungus growth in the supply water due to the substantially closed loop construction. In contrast to a conventional evaporative cooler in which a large volume of water is maintained in air contact relation within the pan 12, in the present invention the supply water is substantially sealed from air contact. In the event that some fungus growth does develop, a small amount of chlorine bleach may be periodically manually introduced and circulated within the system by operation of the pump 34. By virtue of the precooling effect of the supply water to the evaporative cooler provided by the apparatus 10 of the present invention, the efficiency of a conventional evaporative cooler C may be increased to within about 20% of the efficiency of a refrigerant type air conditioner.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. In combination with an evaporative cooler, including a water pan, the improvement comprising:
    an inlet reservoir disposed below said pan and in fluid communication therewith for draining water from said pan by gravity flow;
    a water supply line communicating said inlet reservoir and including a valve for maintaining a predetermined water level in said inlet reservoir;
    a subterranean vessel containing a cooling coil, an inlet of said cooling coil connected to an outlet of said inlet reservoir and an outlet of said cooling coil discharging within said vessel;
    an outlet reservoir disposed below said pan and housing a pump having an outlet for supplying water to said evaporative cooler; and
    a return line having an inlet in said vessel and an outlet connected to an inlet of said pump in said outlet reservoir for returning cooled water from said vessel to said evaporative cooler.

2. The combination of claim 1, wherein said valve comprises a float valve.

3. The combination of claim 1, wherein said inlet and outlet reservoirs are disposed at substantially the same elevation.

4. The combination of claim 1, wherein said inlet reservoir is secured to a bottom surface of said pan.

5. The combination of claim 1, further comprising a filter connected to a drain conduit for draining water from said pan to said inlet reservoir.

6. The combination of claim 1, wherein said outlet reservoir is secured to a bottom surface of said pan.

7. The combination of claim 1, wherein said inlet reservoir, said outlet reservoir, said subterranean vessel and said cooling coil are all formed from PVC pipe.

8. The combination of claim 1, wherein said coil includes means for circulating water from said reservoir within said vessel and for subsequently discharging and mixing water from said coil within said vessel.

9. The combination of claim 1, further comprising a plurality of brackets securing said inlet and outlet reservoirs to a bottom surface of said pan.

10. A method of precooling water supplied to an evaporative cooler including a water pan, comprising the steps of:
    securing an inlet reservoir in fluid communication with said pan for draining water from said pan by gravity flow;
    connecting a water supply line in fluid communication with said inlet reservoir and providing a valve for maintaining a predetermined water level in said inlet reservoir;

providing a subterranean vessel containing a cooling coil, connecting an inlet of said cooling coil to an outlet of said inlet reservoir and disposing an outlet of said cooling coil for discharge within said vessel;

securing an outlet reservoir below said pan and providing a pump within said outlet reservoir, connecting an outlet of said pump for supplying water to said evaporative cooler; and providing a return line including an inlet disposed in said vessel and connecting an outlet of said return line to an inlet of said pump in said outlet reservoir for returning cooled water from said vessel to said evaporative cooler.

11. The method of claim 10, wherein said valve comprises a float valve.

12. The method of claim 10, further comprising the step of securing said inlet and outlet reservoirs at substantially the same elevation.

13. The method of claim 10, further comprising the step of securing said inlet reservoir to a bottom surface of said pan.

14. The method of claim 10, further comprising the step of providing a filter for filtering water draining from said pan to said inlet reservoir.

15. The method of claim 10, further comprising the step of securing said outlet reservoir to a bottom surface of said pan.

16. The method of claim 10, further comprising the step of circulating water within said coil in said vessel and discharging water from said coil in said vessel for mixing therein.

17. A method of precooling water supplied to an evaporative cooler, comprising the steps of:

providing an inlet reservoir disposed below said pan and connecting said inlet reservoir for draining water from said pan by gravity flow;

providing a water supply line and a valve mechanism in fluid communication with said inlet reservoir for maintaining a predetermined water level in said inlet reservoir;

providing a subterranean vessel including a coil inlet connected to an outlet of said inlet reservoir and a coil outlet discharging into said vessel;

providing an outlet reservoir at substantially the same elevation as said inlet reservoir and connecting said outlet reservoir for supplying water to said evaporative cooler;

providing a return line having an inlet in said vessel and an outlet connected to said outlet reservoir; and draining water from said pan into said inlet reservoir and into said coil within said subterranean vessel by gravity flow;

circulating said water through said coil and discharging and mixing said water within said vessel; and returning said water from said vessel to said evaporative cooler.

18. The method of claim 17, further comprising the step of providing a pump in said outlet reservoir for supplying water from said return line to said evaporative cooler.

19. The method of claim 17, further comprising the step of securing said inlet and outlet reservoirs to a bottom surface of said pan.

20. The method of claim 17, further comprising the step of filtering water drained from said pan into said inlet reservoir.

* * * * *